United States Patent
Bar-David et al.

[11] Patent Number: 6,147,985
[45] Date of Patent: *Nov. 14, 2000

[54] SUBSPACE METHOD FOR ADAPTIVE ARRAY WEIGHT TRACKING

[75] Inventors: Israel Bar-David, Haifa, Israel; Glenn David Golden, Boulder County, Colo.; Jack Harriman Winters, Middletown, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/848,945

[22] Filed: May 1, 1997

[51] Int. Cl.$^7$ .............. H04B 7/212; H04B 1/10; G01R 31/08; G06F 11/00
[52] U.S. Cl. .............. 370/347; 370/252; 455/303
[58] Field of Search ............... 375/346, 348, 375/349, 350, 347, 267; 455/132, 303; 370/252, 336

[56] References Cited

U.S. PATENT DOCUMENTS

| | | | |
|---|---|---|---|
| 5,724,660 | 3/1998 | Kauser | 455/456 |
| 5,787,131 | 7/1998 | Bottomley | 375/349 |
| 5,796,779 | 8/1998 | Nussbaum | 375/349 |
| 5,819,168 | 10/1998 | Golden et al. | 455/303 |
| 5,875,216 | 2/1999 | Martin | 375/347 |
| 5,887,037 | 3/1999 | Golden et al. | 375/347 |
| 5,887,038 | 3/1999 | Golden | 375/347 |

OTHER PUBLICATIONS

Winters, Jack H. et al. "The Impact of Antenna Diversity on the Capacity of Wireless Communication Systems", IEEE Transactions on Communications vol. 42, No. 2/3/4, Feb./Mar./Apr. 1994.

Winters, Jack H.,"Signal Acquisition and Tracking with Adaptive Arrays in the Digital Mobile Radio System IS–54 with Flat Fading"; IEEE Transactions on Vehicular Technology, vol. 42, No. 4, Nov. 1993.

*Primary Examiner*—Alpus H. Hsu
*Assistant Examiner*—Duc Ho
*Attorney, Agent, or Firm*—Gibbons, Del Deo, Dolan, Griffinger & Vecchione

[57] ABSTRACT

An apparatus for performance improvement of a digital wireless receiver comprises a processing circuit for processing a plurality of received signals and providing a processed signal, wherein a plurality of weights is applied to the plurality of received signals producing a plurality of weighted received signals. The plurality of weighted received signals are combined to provide the processed signal. A weight generation circuit generates the plurality of weights wherein weights are based on a given number of interferers.

24 Claims, 8 Drawing Sheets

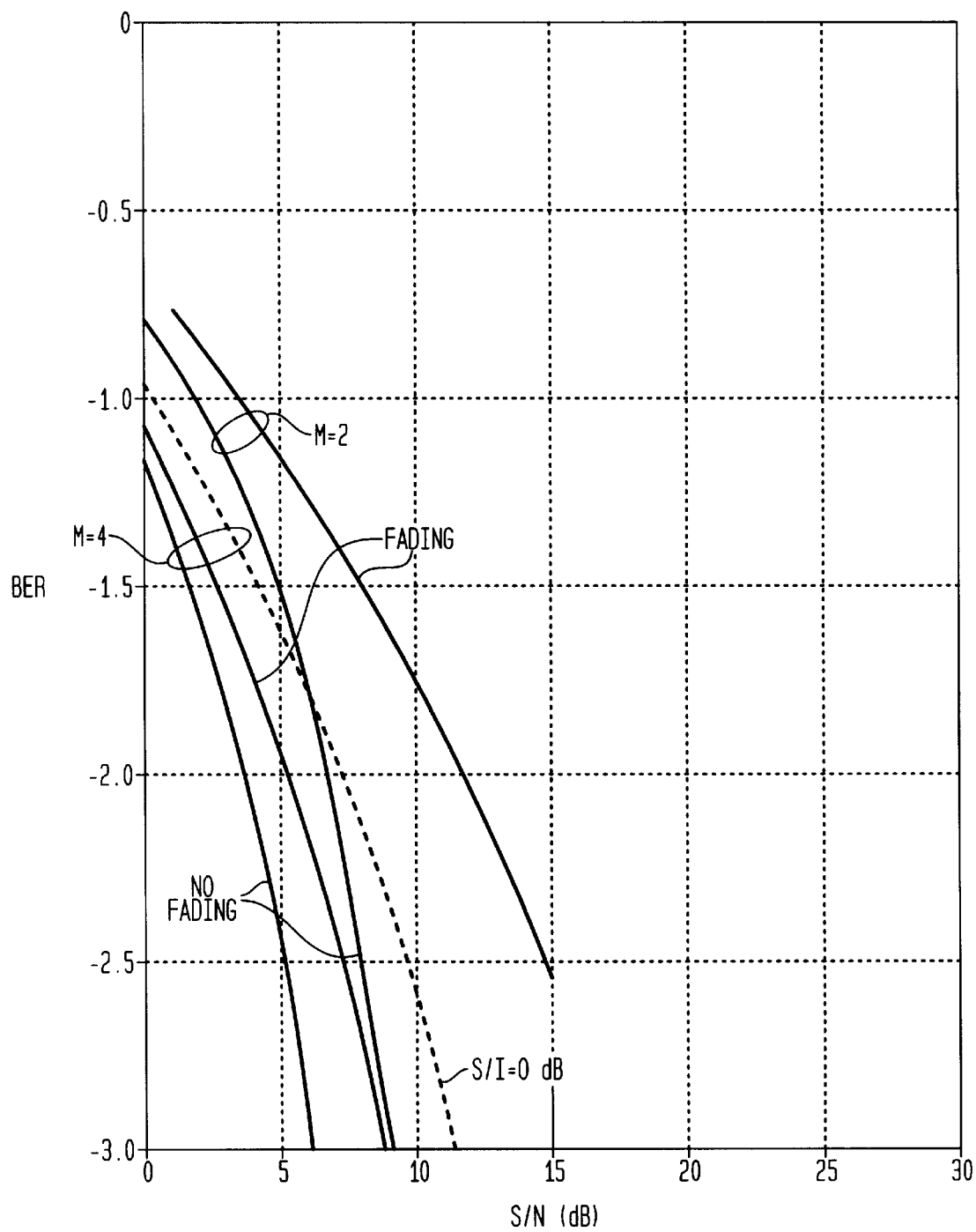

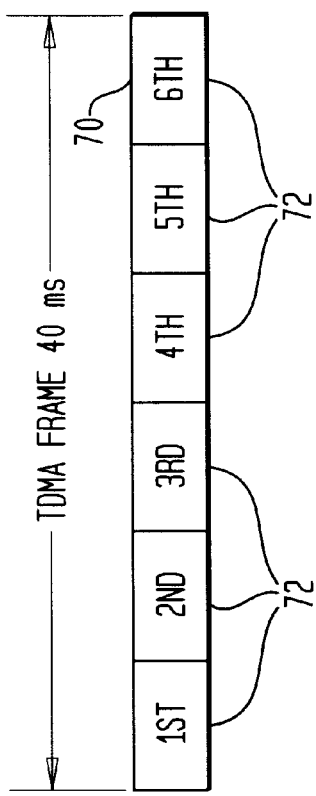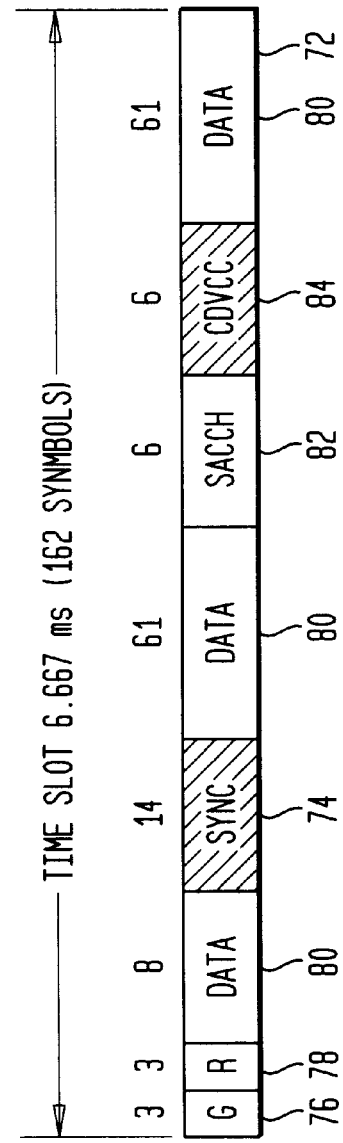

SUBSPACE METHOD FOR ADAPTIVE ARRAY WEIGHT TRACKING

CROSS REFERENCES TO RELATED APPLICATIONS

This application is related to copending U.S. patent application Ser. No. 08/847,956, now is U.S. Pat. No. 5,887,038 entitled "Adaptive Antenna Array Processing Arrangement Using A Combined Coherent And Constant-Modulus Reference Signal", copending U.S. patent application Ser. No. 08/856,566, now is U.S. Pat. No. 5,937,018 entitled "DC Offset Compensation Using Antenna Arrays" filed on May 29, 1997, copending U.S. patent application Ser. No. 08/756,293, now is U.S. Pat. No. 5,940,453 entitled "Artificial Fading for Frequency Offset Mitigation" filed on Nov. 25, 1996, copending U.S. patent application Ser. No. 08/716,659, entitled "Joint Timing, Frequency And Weight Acquisition For an Adaptive Array" filed on Sep. 6, 1996, copending U.S. patent application Ser. No. 08/606,777, entitled "Introducing Processing Delay As A Multiple Of The Time Slot Duration" filed on Feb. 27, 1996 and copending U.S. patent application Ser. No. 08/695,492, entitled "Output Signal Modification For Soft Decision Decoding" filed on Aug. 12, 1996.

FIELD OF THE INVENTION

The present invention relates to the field of wireless communication and more particularly to digital wireless communications systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate $N \leq M-1$ interferers and achieve an M–N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques, as well as incorporate adaptive arrays into new base stations. However, modifying existing equipment is difficult, time consuming, and costly, in particular, since equipment currently in the field is from a variety of vendors.

One alternative is to use a so called appliqué, which is an outboard signal processing box interposed between the current base antennas and the input to the base station, and which adaptively weights and combines the received signals fed to the base station, optionally uses additional antennas. A key to the viability of using the appliqué approach is that it should require little, if any, modification of the base station equipment. This implies that the processing performed by the appliqué must be transparent to the existing equipment. Ideally, the signal emerging from the appliqué should appear to the existing base station as a high-quality received signal from a single antenna.

The signal processing functions performed by an adaptive array are typically designed to maximize the signal to interference-plus-noise ratio. One well known method for accomplishing this is by adjusting the adaptive array weights so as to minimize the mean squared error of the output signal with respect to a reference signal over a finite sampling window. However, at high fading rates, such as in mobile radio, this weight generation does not work well.

In light of the above considerations there is therefore a need for adaptive array weight generation that increases gain and improves interference suppression.

SUMMARY OF THE INVENTION

In accordance with the present invention, there is provided an apparatus for performance improvement of a digital wireless receiver. The apparatus comprises a processing circuit for processing a plurality of received signals and providing a processed signal, wherein a plurality of weights is applied to the plurality of received signals producing a plurality of weighted received signals. The plurality of weighted received signals are combined to provide the processed signal. A weight generation circuit generates the plurality of weights in which the values of the weights are based on a given number of interferers.

BRIEF DESCRIPTION OF THE DRAWINGS

A more complete understanding of the present invention may be obtained from consideration of the following description in conjunction with the drawings in which:

FIG. 2 is a graphical representation of BER versus S/N for 2 and 4 antennas;

FIGS. 3A and 3B show a TDMA frame and time slot architecture of a uplink digital traffic channel used in IS-136.

DETAILED DESCRIPTION OF VARIOUS ILLUSTRATIVE EMBODIMENTS

Although the present invention is particularly well suited for use in Time Division Multiple Access (TDMA) mobile radio systems, such as North American Digital Mobile Radio Standard IS-136, and shall be described with respect to this application, the methods and apparatus disclosed here can be applied to other digital wireless communication systems. Other systems include, but are not limited to, the North American Mobile Radio Standard IS-54, the Groupe Speciale Mobile (GSM) based system, also known as Global System for Mobile Communications, which is a standard digital cellular phone service used in Europe and Japan, and the Digital European Cordless Telecommunications (DECT) based system, which is a pan-European digital cordless telephony interface specification. Although the present invention is suited for use with an appliqué and shall be described with respect to this application, the methods and apparatus disclosed here are equally well suited to an integrated application of adaptive arrays in a base station.

Figure 1:
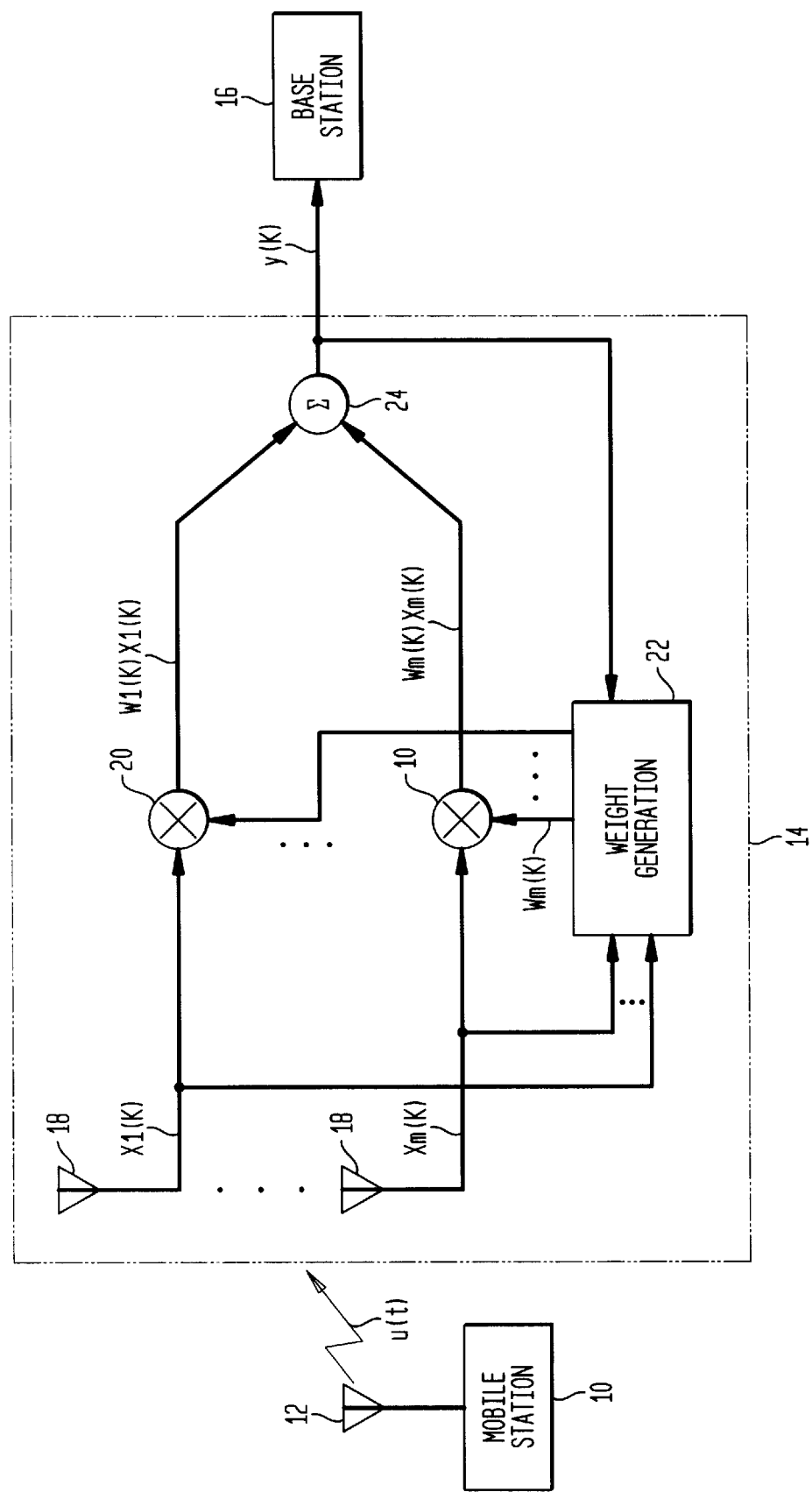
FIG. 1 is a block diagram of an adaptive array using multiple antennas.

Referring to FIG. 1 there is shown a block diagram of a type of signal processing used in a base station appliqué. A signal u(t) transmitted by a mobile station 10 through a mobile antenna 12 is received by a base station 16 from M antennas 18, with received signals $x_1(k)$ to $x_M(k)$, respectively. The received signals are weighted using multipliers 20 having weights $w_1(k)$ to $w_M(k)$, respectively, to generate corresponding weighted signals $w_1(k)x_1(k)$ to $w_M(k)x_M(k)$. The weighted signals $w_1(k)x_1(k)$ to $w_M(k)x_M(k)$ are then combined using summer 24 to generate an output signal y(k) which is then provided to base station equipment 16. Weights $w_1(k)$ to $w_M(k)$ are generated by weight generation circuitry 22 based upon computations performed upon received signals $x_1(k)$ to $x_M(k)$ and output signal y(k). At the appliqué processor circuitry 14, received signals $x_1(k)$ to $x_M(k)$ are weighted and combined to improve signal quality at the output.

With the correct symbol timing and carrier frequency, the weights can be generated to combine the signals received from multiple antennas to increase gain and suppress interference, permitting operation even with noise and/or interference power that is greater than the signal power.

Weight Generation—Ideal Tracking Performance

The complex baseband signal received by the with element in the kth symbol interval $x_i(k)$ is multiplied by a controllable complex weight $w_i(k)$ producing a weighted signal. The weighted signals are then summed to form the array output y(k). Thus, the output signal is given by $$y(k) = w^T(k)x(k), \qquad (1)$$

where the weight vector w is given by $$w = [w_1 w_2 \ldots w_M]^T, \qquad (2)$$

the superscript T denotes transpose, and the received signal vector x is given by $$x = [x_1 x_2 \ldots x_M]^T. \qquad (3)$$

The received signal consists of the desired signal, thermal noise, and interference, and therefore, can be expressed as $$x = x_d + x_n + \sum_{j=1}^{L} x_j, \qquad (4)$$

where $x_d$ is the received desired signal, $x_n$ is the received noise signal and $x_j$ is the jth interfering signal vector, and L is the number of interferers. Furthermore, let $s_d(k)$ and $s_j(k)$ be the desired and jth interfering signals, with $$E[|s_d(k)|^2] = 1, \qquad (5)$$

and $$E[|s_j(k)|^2] = 1 \text{ for } 1 \leq j \leq L. \qquad (6)$$

Then x can be expressed as $$x = u_d s_d(k) + x_n + \sum_{j=1}^{L} u_j s_j(k), \qquad (7)$$

where $u_d$ and $u_j$ are the desired and jth interfering signal propagation vectors, respectively.

The received signal correlation matrix is given by $$R_{xx} = E[x^* x^T] = E\left[\left(x_d + x_n + \sum_{j=1}^{L} x_j\right)^* \left(x_d + x_n + \sum_{j=1}^{L} x_j\right)^T\right] \qquad (8)$$

where the superscript * denotes complex conjugate and the expectation is taken with respect to the signals $s_d(k)$ and $s_j(k)$, and the received noise signal $x_n$. Assuming the desired signal, noise, and interfering signals are uncorrelated, the expectation is evaluated to yield $$R_{xx} = u_d^* u_d^T + \sigma^2 I + \sum_{j=1}^{L} u_j^* u_j^T, \qquad (9)$$

where $\sigma^2$ is the noise power and I is the identity matrix. Note that $R_{xx}$ varies with the fading and that we have assumed that the fading rate is much less than the symbol rate.

We define the received desired signal-to-noise ratio S/N as $$S/N = \frac{E[|u_{di}|^2]}{\sigma^2} \; I = 1, M \qquad (10)$$

the interference-to-noise ratio (INR) as (for the jth, j=1, L, interferer)

$$INR_j = \frac{E[|u_{ji}|^2]}{\sigma^2} \; I = 1, M \; j = 1, L \qquad (11)$$

and the signal-to-interference-plus-noise ratio (SINR) as $$SINR = \frac{S/N}{1 + \sum_{j=1}^{L} INR_j} \qquad (12)$$

where the expected value now is with respect to the propagation vectors.

For the digital mobile radio system IS-136 without interference, the weights that minimize the bit error rate (BER) also minimize the mean squared error (MSE) in the output signal, where the error is the difference between the output signal y(k) and a reference signal d(k), which ideally is the transmitted data $s_d(k)$. With interference, the weights that minimize the MSE also reduce the output signal BER, but do not necessarily minimize the BER. However, the minimum MSE (MMSE) weights are typically utilized in this case as well, since they are more mathematically tractable and yield results that are typically close to the minimum BER weights. The MMSE weights, which also maximize the output SINR, are given by $$w(k) = R_{xx}^{-1}(k) r_{xd}(k), \qquad (13)$$

where $$r_{xd}(k)=E[x(k)^*d(k)]=u_d \qquad (14)$$

and the superscript −1 denotes the inverse of the matrix. In Equation (3), $R_{xx}$ is assumed to be nonsingular so that $R_{xx}^{-1}$ exists. If not, pseudoinverse techniques can be used to solve for w.

First consider the performance of MMSE combining with a perfect knowledge of $R_{xx}$ and $r_{xd}$. Assume independent Rayleigh fading at each antenna and no delay spread, and determine the BER averaged over the fading with differential detection of the π/4-shifted differential quadrature phase shift keyed signal (DQPSK) signal of IS-136. With interference, the BER was determined by Monte Carlo simulation.

FIG. 2 shows the BER versus S/N for 2 and 4 antennas. For each data point the BER is averaged over 29,000 symbols. Results are shown with noise only, both with and without desired signal fading, and with an interferer having the same power (averaged over the fading) as the desired signal with fading of both the desired and interfering signals. These results show that with fading and no interference, the required S/N for a $10^{-2}$ BER is reduced by 6 dB with 4 versus 2 antennas. This corresponds to about 40% greater range in environments with a 4th law power loss exponent. Also, this required S/N with 4 antennas and fading is 2 dB lower than that required with 2 antennas without fading. Furthermore, even with an equal power interferer, the required S/N is 4 dB lower with 4 antennas than with 2 antennas and no interference. Thus, a four antenna base station can theoretically achieve both greater range and higher capacity on an uplink than a current two-antenna base station.

Weight Tracking with Direct Matrix Inversion

Consider the implementation of MMSE combining using direct matrix inversion (DMI) (also known as sample covariance matrix inversion). Using a rectangular averaging window, the weights are given by $$w(k+1)=\hat{R}_{xx}^{-1}(k)\hat{r}_{xd}(k), \qquad (15)$$

where $$\hat{R}_{xx}(k) = \frac{1}{K}\sum_{j=k-K+1}^{k} x^*(j)x^T(j), \qquad (16)$$

$$\hat{r}_{xd}(k) = \frac{1}{K}\sum_{j=k-K+1}^{k} x^*(j)d(j) \qquad (17)$$

and K is the window length.

Referring to FIG. 3A, there is shown the TDMA frame 70 and time slots 72. In each frame, a user is given two time slots (full rate), e.g., time slots 3 and 6. Referring to FIG. 3B, there is shown in detail a time slot structure 72 of IS-136 uplink (mobile station to base station) digital traffic channel. This is a TDMA frame structure, wherein data transmitted from each mobile station (cellular phone) user is transmitted periodically in time slots 72 or "bursts". There are 6 time slots 72 defined per frame 70. The duration of frame 70 is 40 ms, and each time slot 72 is one-sixth of the frame duration, approximately 6.7 ms. Each time slot 72 comprises 162 symbols, including synchronization (SYNC) sequence 74, SYNC 74 comprising symbols 15 through 28. This synchronization sequence is fixed and known a priori at the receiver.

For uplink transmission each time slot consists of 3 guard symbols 76, 3 ramp symbols 78, 130 data symbols 80, a 14 symbol synchronization sequence (SYNC) 74, a 6 symbol SACCH 82 sequence and a 6 symbol CDVCC 84 sequence. The synchronization sequence 74 is known at the base station and is used to acquire the initial weights. Thus, synchronization sequence 74 is used as the reference signal for initial weight acquisition, and subsequently the coherently detected data is used as the reference signal, i.e., $$d(k)=\mathrm{quan}(w^T(k)x(k)) \qquad (18)$$

where quan (•) denotes $$\frac{\pi}{4}$$

QPSK coherent detection. Note that coherent detection for the reference signal has been considered even though differential detection was assumed for the base station. This is because the weight generation algorithms that are of interest require a coherent reference signal, and coherent detection requires about a 1 dB lower S/N for the same BER, and thus is more reliable.

The performance with the DMI weights given by Equation (15) will be worse than the performance with the ideal tracking weights given by Equation (13) because of three factors. First, the transmission channel can vary over the window of length K. For example, a 1.9 GHz carrier frequency with vehicle speeds up to 60 mph, corresponds to fading rates as high as 184 Hz. At these rates, the phase of the transmission channels can change a few degrees each symbol. The weights calculated over the K symbol window are used to generate the output signal and reference signal sample just after the window. Thus, the degradation due to channel variation increases with K.

A second degradation is due to noise in the weight calculation. The S/N degradation due to noise depends on the ratio of K to the number of weights, M. For M=4 and K=8 the degradation is about 3 dB, and the degradation decreases with increasing K.

A third degradation is due to error propagation. With a coherently-sliced data-derived reference signal, detection errors increase the error in the weights. Since this increases the BER, error propagation can occur, resulting in a complete loss of tracking and a large error burst that can last until the end of the time slot. The degradation due to detection errors decreases with increasing K.

Figure 4:
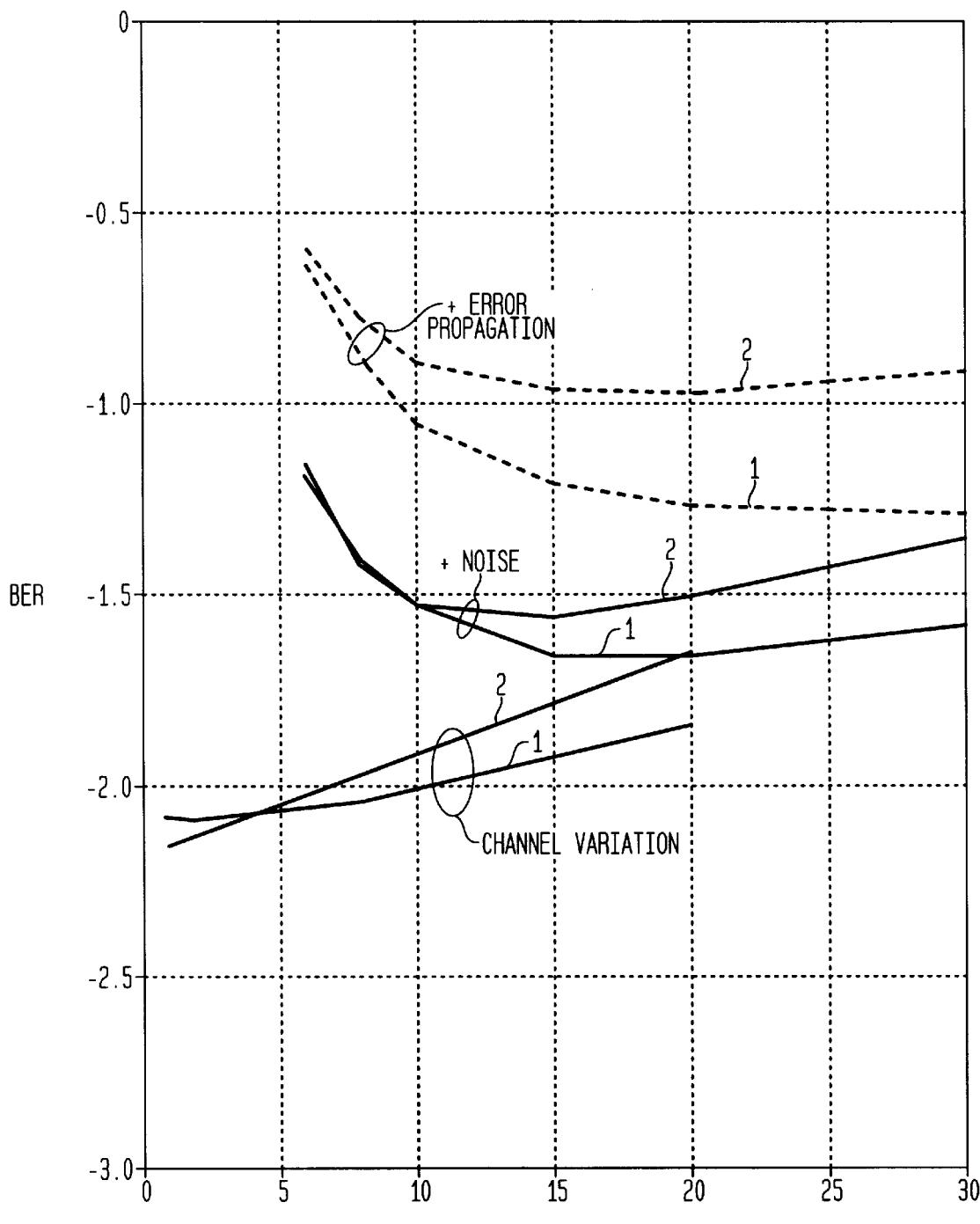
FIG. 4 is a graphical representation of BER versus K with a 184 Hz fading rate.

FIG. 4 shows the BER versus K for the above three degradations with a 184 Hz fading rate. Two cases are shown: 1) S/N=4.5 dB with noise only, and 2) S/N=6.5 dB with an equal power interferer (S/I=0 dB). These results are for coherent detection of the array output signal, but similar conclusions were obtained with differential detection. These S/N's were chosen because they result in a $10^{-2}$ BER with ideal weights. FIG. 4 shows the performance with channel variation only (known $R_{xx}$ and $r_{xd}$, but averaged over a rectangular window of length K), with channel variation and noise (Equation (15) with an ideal reference signal), and with all three impairments. With channel variation only, the degradation is shown to increase montonically with K. When the effect of noise in the estimation is also included, the BER is seen to be dominated by the effect of noise for small K, but the BER decreases with K until the effect of channel variation becomes significant. Error propagation is seen to dominate the other two effects, especially with small K. As a result, the BER decreases with K until K is about 14, but remains about the same for K>14. Thus, a window size of 14 yields close to the best performance for these cases. However, note that the cases studied have an order of magnitude increase in BER due the degradations, even with K=14.

Figure 5:
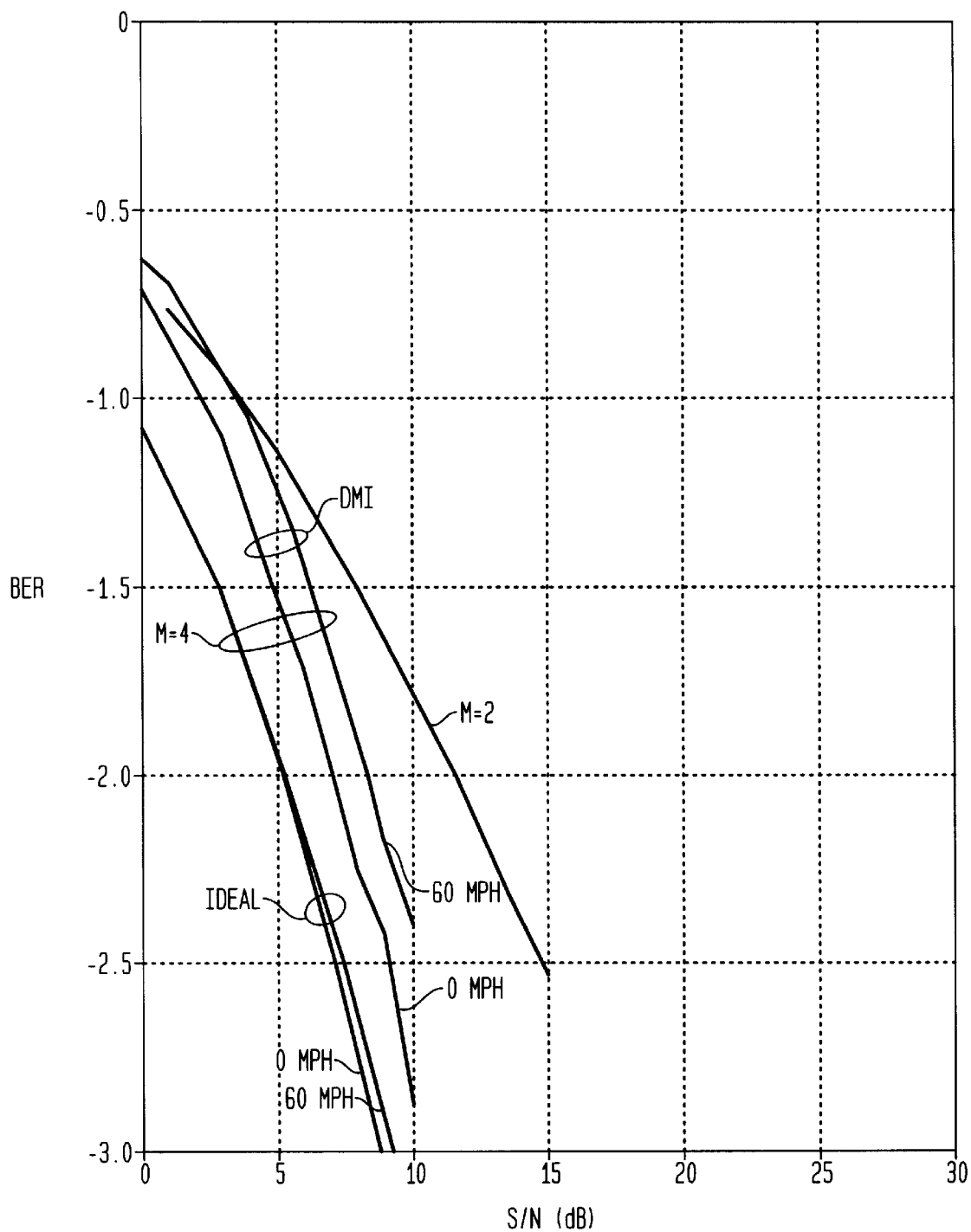
FIG. 5 is a graphical representation of BER versus S/N of DMI with noise only.

FIG. 5 shows the BER versus S/N of DMI with noise only. Results are shown for the ideal weights given by Equation (13) with 2 and 4 antennas at 0 and 184 Hz fading, with DMI with 4 antennas at 0 and 184 Hz fading and K=14. Note that even with the ideal weights the BER increases at 184 Hz because of the channel variation over each symbol. With DMI, the required S/N for a $10^{-2}$ BER is increased by 1.2 and 2.7 dB at 0 and 184 Hz, respectively. Thus, at 184 Hz, the implementation loss in gain is nearly half of (in dB) the theoretical gain achieved with 4 versus 2 antennas.

Figure 6:
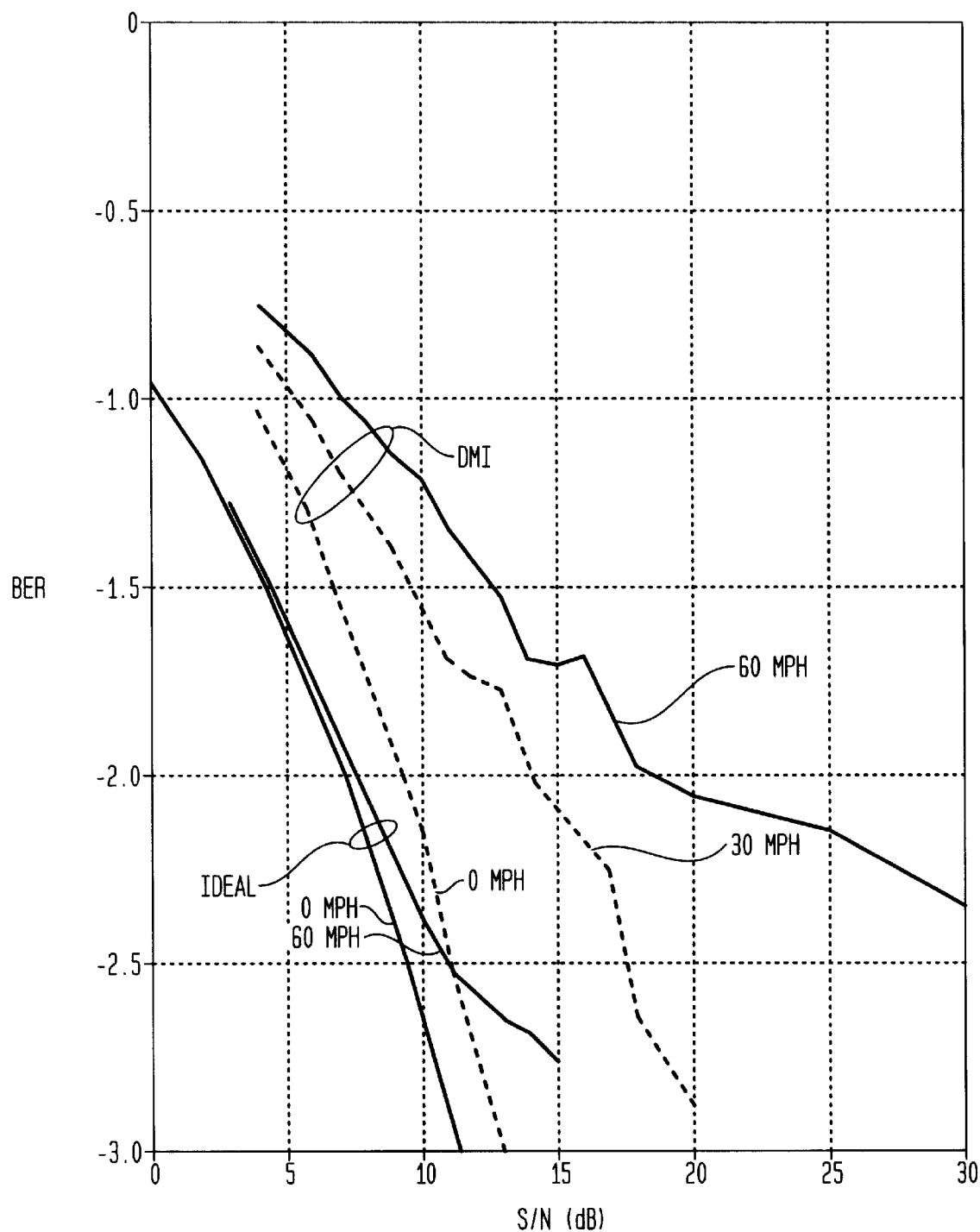
FIG. 6 is a graphical respesentation of BER versus S/N of DMI with an equal power interferer.

FIG. 6 shows the BER versus S/N of DMI with an equal power interferer. Results are shown for the ideal weights given by Equation (13) with 4 antennas at 0 and 184 Hz fading of both the desired and interfering signals, and DMI with 4 antennas at 0, 92, and 184 Hz fading. With DMI, the required S/N for a $10^{-2}$ BER is increased by 2.1 and 11 dB at 0 and 184 Hz, respectively. At 184 Hz, an error floor is seen close to the required $10^{-2}$ BER. Thus, DMI suffers substantial degradation at high fading rates.

Subspace Methods to Improve Weight Tracking

The estimation error in calculating M weights with K samples depends on the ratio K/M. Specifically, this is related to the fact that M(M+1)/2 complex terms of $\hat{R}_{xx}$ are estimated (since $\hat{R}_{xx}$ is Hermitian) and M complex terms of $\hat{r}_{xd}$ are estimated. However, from Equation (9) it can be seen that $R_{xx}$ actually consists of (L+1)M complex terms and one real scalar term ($\sigma^2$), with the M terms that describe the desired signal channels being the same terms as those in $r_{xd}$. To remove those M terms from $R_{xx}$, consider the weights that maximize the SINR, $$w = R_{i+n}^{-1} r_{xd}, \tag{19}$$

where $$R_{i+n} = \sigma^2 I + \sum_{j=1}^{L} u_j^* u_j^T, \tag{20}$$

or $$R_{i+n} = E[(x - r_{xd}^* d)^*(x - r_{xd}^* d)^T]. \tag{21}$$

These weights are the same as those given by Equation (13), except for a scale factor which doesn't matter for DQPSK. This algorithm can be implemented as $$w(k) = \hat{R}_{i+n}^{-1}(k) \hat{r}_{xd}(k) \tag{22}$$

where $$\hat{R}_{i+n}(k) = \frac{1}{K} \sum_{j=k-K+1}^{k} \left(x(j) - \hat{r}_{xd}^* \hat{d}\right)^* \left(x(j) - \hat{r}_{xd}^* \hat{d}\right)^T \tag{23}$$

which yields similar performance to Equation (15) as verified by simulation results. Thus, if LM<M(M+1)/2, i.e., L<(M+1)/2, the weights can be more accurately calculated by determining the $u_j$'s, rather than all the terms of $R_{xx}$, specifically, for L=0, $R_{i+n} = \sigma^2 I$, and $$w(k) = \hat{r}_{xd}(k), \tag{24}$$

which are the weights for maximal ratio combining. Note that with maximal ratio combining, the accuracy of the weights is independent of M. Also note that the reason that DMI has poorer performance than maximal ratio combining when interference is not present is because DMI considers the noisy cross correlation terms as being due to interference and tries to null this interference.

For L=1, $$R_{i+n} = \sigma^2 I + u_1^* u_1^T \tag{25}$$

and $$w(k) = (\sigma^2 I + \hat{u}_1^*(k) \hat{u}_1^T(k))^{-1} \hat{r}_{xd}(k) \tag{26}$$

If the received interferer power is large compared to $\sigma^2$, then the interfering signal propagation vector, $\hat{u}_1(k)$, is also the eigenvector corresponding to the largest eigenvalue of $\hat{R}_{i+n}(k)$, i.e., the dominant eigenvalue, multiplied by the square root of that eigenvalue. Also note that this eigenvector can be calculated from $\hat{R}_{i+n}(k)$ using the power method. The noise variance may be known a priori (since the dominant noise source is typically receiver thermal noise, which is often known to the designers), or can be calculated from the eigenvalues of $\hat{R}_{i+n}$, i.e., $$\sigma^2 = \frac{tr[\hat{R}_{i+n}] - \lambda_1}{4}, \tag{27}$$

where $\lambda_1$ is the largest eigenvalue of $R_{i+n}$ and $tr[\bullet]$ denotes matrix trace.

By the matrix inversion lemma, the weights given by Equation (26) can be calculated without inverting a matrix, i.e., ignoring a weight scale factor, $$w(k) = [I - (\sigma^2 + |\hat{u}_1(k)|^2)^{-1} \hat{u}_1^*(k) \hat{u}_1^T(k)] \hat{r}_{xd}(k) \tag{28}$$

Thus, with the subspace method, the array output signal is the maximal ratio combining output signal minus a second term determined by the interferer. Note also that if $\sigma^2$ is removed from Equation (28), the weights are those given by eigenanalysis, where the weights are orthogonal to the interferer subspace, i.e., $$w(k) = [I - (|\hat{u}_1(k)|^2)^{-1} \hat{u}_1^*(k) \hat{u}_1^T(k)] \hat{r}_{xd}(k) \tag{29}$$

With these weights the array completely nulls the interferer, independent of the noise, and thus the algorithm is zero-forcing rather than MMSE combining. Thus, eigenanalysis, Equation (29), typically has poorer performance than Equation (28).

This process can be extended to more interferers, with diminishing returns. For L≧2, the first L eigenvectors of $R_{i+n}$ are not necessarily the $u_j$'s, since in general the $u_j$'s are not orthogonal. However, the number of eigenvalues greater than $\sigma^2$ will in general still be equal to the number of interferers, and the subspace method using the eigenvectors of $R_{i+n}$, can be used for improved weight estimation if L<(M+1)/2. Note that for M=4, L=2 is the maximum number of interferers for which the technique is useful.

Figure 7:
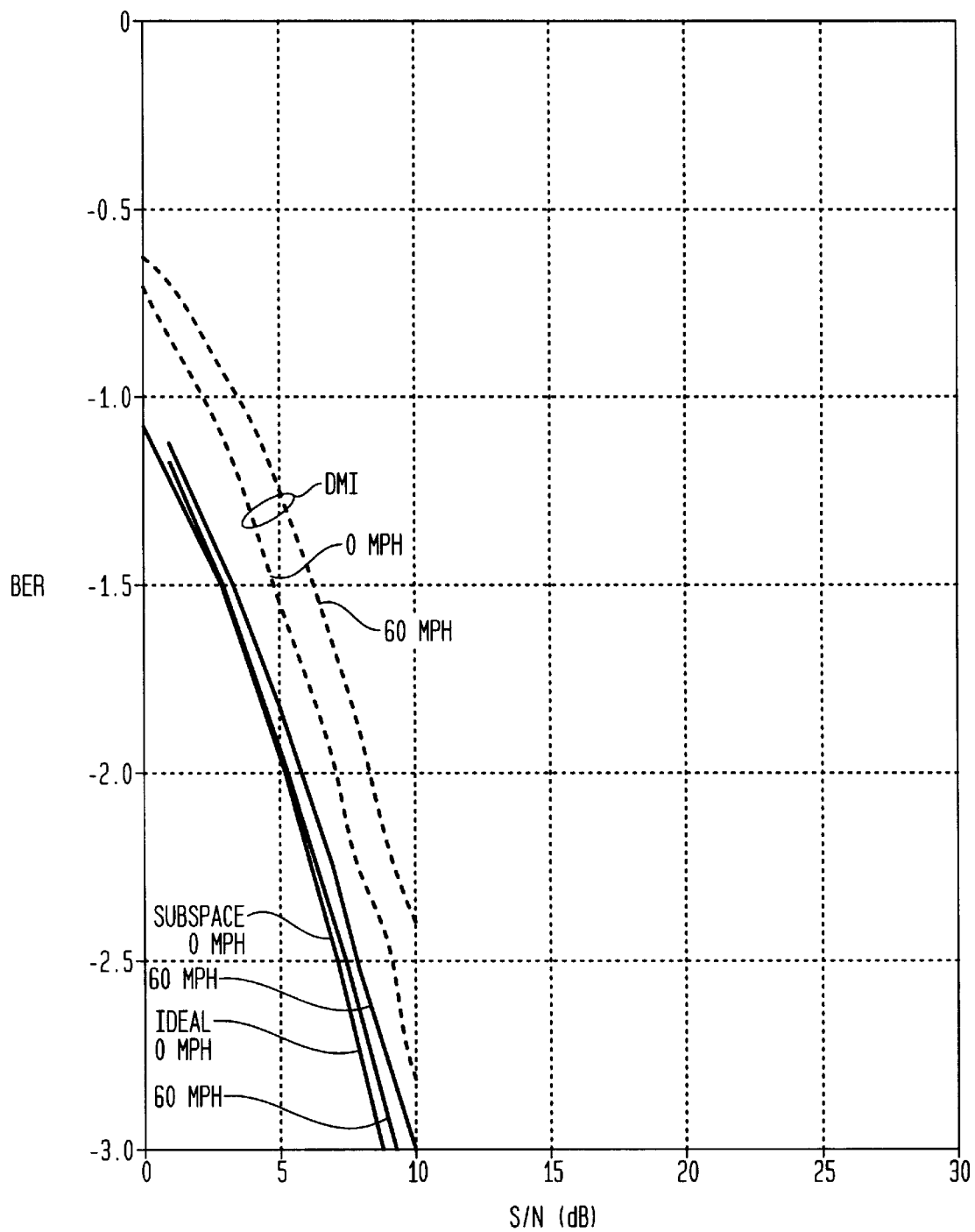
FIG. 7 is a graphical representation of BER versus S/N when interference is not present; and, FIG. 8 is a graphical representation of BER versus S/N when a single interferer is present.

FIG. 7 shows the BER versus S/N with maximal ratio combining (Equation (24)) when interference is not present. With the subspace method, the degradation in required S/N for a given BER is less than 0.5 dB even with 184 Hz fading.

Figure 8:
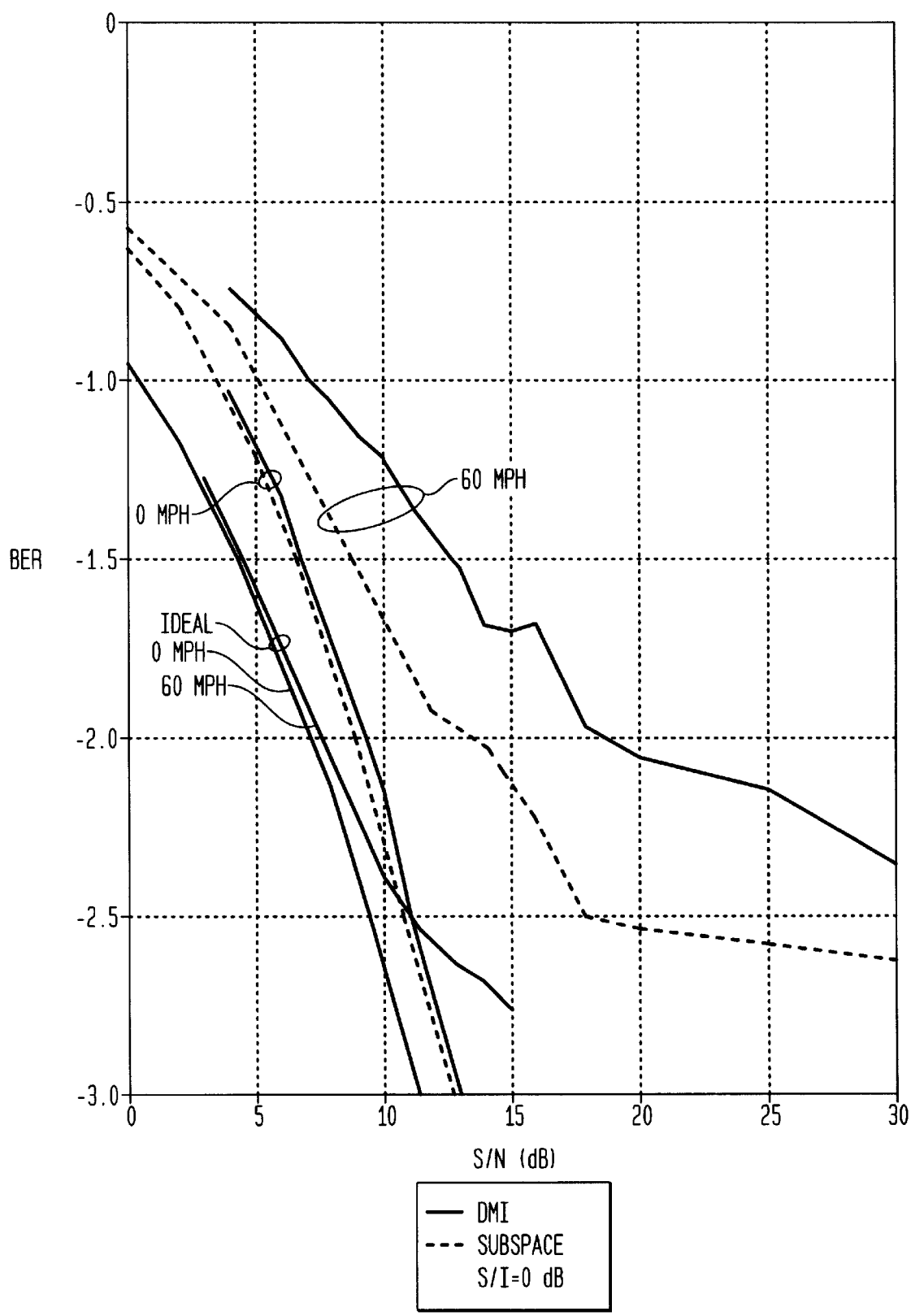

FIG. 8 shows the BER versus S/N using Equation (26) when a single interferer is present with S/I=0 dB. For this case, K was reduced to 8 for better performance. Here, the degradation with 184 Hz fading has been reduced from 11 dB (with DMI) to 5 dB.

A key issue for the subspace method is the knowledge of the number of significant interferers, which is equal to the number of eigenvalues of $R_{i+n}$ that are greater than $\sigma^2$. In practice, it will often be reasonable to assume that the number of interferers is known and fixed, e.g. if one wishes to use an adaptive array for range extension alone, then presumably it would be known a priori that there would be no interferers. In cases where no interference is not a reasonable assumption, it is feasible to determine the number of interferers by computing the eigenvalues of $R_{i+n}$ over several time slots (since the number of dominant interferers should not vary over short periods of time), or by calculating the weights for each feasible number of interferers and using the weights that result in the minimum mean squared error in the output signal over several time slots.

CONCLUSION

Embodiments of the present invention of an adaptive antenna array for IS-136 base stations provide range extension and cochannel interference suppression on the uplink. The adaptive weight generation algorithm in the prior art is direct matrix inversion using symbol-by-symbol sliding window weight computation. Simulation results showed the performance of this algorithm in 184 Hz fading (corresponding to 60 mph at 1.9 GHz) and found that at these fading rates, there is significant tracking degradation. The present invention provides enhancements to this algorithm to improve weight tracking performance.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a digital wireless receiver comprising:
    a processing circuit for processing a plurality of received signals and providing a processed signal, wherein a plurality of weights is applied to said plurality of received signals producing a plurality of weighted received signals and said plurality of weighted received signals are combined to provide said processed signal; and
    a weight generation circuit for generating said plurality of weights from a determined number of interferers, wherein said weights are based on a noise level and a determined number of interferers, said weight generation circuit determines said determined number of interferers by calculating weights for each possible number of interferers and using only those said weights corresponding to said determined number of interferers to minimize mean square error in said processed signal over several time slots.

2. The apparatus as recited in claim 1, wherein said determined number is predetermined.

3. The apparatus as recited in claim 1, wherein said determined number is determined during generation of said plurality of weights.

4. The apparatus as recited in claim 1, wherein said determined number is known a priori.

5. The apparatus as recited in claim 1, wherein said plurality of received signals comprise TDMA mobile radio signals.

6. The apparatus as recited in claim 5, wherein said TDMA mobile radio signals comprise IS-136 based mobile radio signals.

7. The apparatus as recited in claim 5, wherein said TDMA mobile radio signals comprise IS-54 based mobile radio signals.

8. The apparatus as recited in claim 1, wherein said processing circuit comprises a digital signal processor.

9. The apparatus as recited in claim 1, wherein said weight generation circuit comprises a digital signal processor.

10. An apparatus for performance improvement of a digital wireless receiver comprising:
    a processing circuit for processing a plurality of received signals and providing a processed signal, wherein a plurality of weights is applied to said plurality of received signals producing a plurality of weighted received signals and said plurality of weighted received signals are combined to provide said processed signal; and
    a weight generation circuit for generating said plurality of weights, wherein said weights are based on a noise level and a determined number of interferers, said weight generation circuit determines said determined number of interferers by determining eigenvalue values greater than a known value of a received signal correlation matrix, $R_{xx}$, over several time slots.

11. A method for performance of a digital wireless receiver comprising the steps of:
    processing a plurality of received signals;
    generating a plurality of weights from a determined number of interferers, based on a noise level and said determined number of interferers, said determined number of interferers determined by calculating weights for each possible number of interferers and using only those said weights corresponding to said determined number of interferers to minimize mean square error in said processed signal over several time slots;
    applying said plurality of weights to said plurality of received signals producing a plurality of weighted received signals; and
    combining said plurality of weighted received signals producing a processed signal.

12. The method as recited in claim 11, wherein said determined number is predetermined.

13. The method as recited in claim 11, wherein said determined number is determined during generation of said plurality of weights.

14. The method as recited in claim 11, wherein said determined number is known a priori.

15. The method as recited in claim 11, wherein said plurality of received signals comprise TDMA mobile radio signals.

16. The method as recited in claim 15, wherein said TDMA mobile radio signals comprise IS-136 based mobile radio signals.

17. The method is recited in claim 15, wherein said TDMA mobile radio signals comprise IS-54 based mobile radio signals.

18. The method as recited in claim 11, wherein the step of processing a plurality of received signals utilizes a digital signal processor.

19. A method for performance of a digital wireless receiver comprising the steps of:
    processing a plurality of received signals;
    generating a plurality of weights from a determined number of interferers, based on a noise level and an determined number of interferers;

determining said determined number of interferers by determining eigenvalue values greater than a known value of a received signal correlation matrix, $R_{xx}$, over several time slots applying said plurality of weights to said plurality of received signals producing a plurality of weighted received signals; and combining said plurality of weighted received signals producing a processed signal.

20. A signal processor for a wireless receiver comprising:

a weight generation circuit for generating a plurality of weights as a function of a noise level and a determined number of interferers, wherein said weight generation circuit determines said determined number of interferers by calculating weights for each possible number of interferers and uses only those said weights corresponding to said determined number of interferers to minimize mean square error in a processed signal over several time slots; and apparatus for combining a plurality of received signals with respective ones of the weights to provide a processed signal as a substitute for an original received signal.

21. The signal processor as recited in claim 20 wherein said determined number is predetermined.

22. The signal processor as recited in claim 20 wherein said determined number being determined during generation of said plurality of weights.

23. The signal processor as recited in claim 20 wherein said determined number is known a priori.

24. A signal processor for a wireless receiver comprising:

a weight generation circuit for generating a plurality of weights of values as a function of a noise level and a determined number of interferers, wherein said weight generation circuit determines said determined number of interferers by determining eigenvalue values of a received signal correlation matrix, $R_{xx}$, greater than a known value over several time slots; and apparatus for combining a plurality of received signals with respective ones of the weight values to provide a processed signal as a substitute for an original received signal.

* * * * *